United States Patent [19]

Leon

[11] Patent Number: 5,498,272
[45] Date of Patent: Mar. 12, 1996

[54] CAPSULE VACUUM CLEANER ASSEMBLY

[76] Inventor: Marty G. Leon, 18416 N. 31 St. Ave., Phoenix, Ariz. 85023-1124

[21] Appl. No.: 238,845
[22] Filed: May 6, 1994
[51] Int. Cl.⁶ ................................................. B01D 46/02
[52] U.S. Cl. ........................... 55/363; 55/378; 55/DIG. 2; 55/DIG. 3
[58] Field of Search ............................... 55/363, DIG. 2, 55/DIG. 3, 368, 378, 379

[56] References Cited

U.S. PATENT DOCUMENTS

| 2,380,382 | 7/1945 | Baker | 55/DIG. 3 |
| 2,652,902 | 9/1953 | Sheahan | 55/378 |
| 2,734,594 | 2/1956 | Meeker | 55/363 |
| 2,810,453 | 10/1957 | Kemitz | 55/363 |
| 3,973,936 | 10/1976 | Howard et al. | 55/363 |
| 4,218,805 | 8/1980 | Brazier | 55/DIG. 3 |

Primary Examiner—Jay H. Woo
Assistant Examiner—Duane S. Smith
Attorney, Agent, or Firm—John P. Halvonik

[57] ABSTRACT

A vacuum cleaner assembly for usage inn wet and dry environments. The interior main canister of the vacuum includes a chamber assembly having a capstan, interface plate and hourglass member for extending the vacuum effect downward from a vacuum motor placed atop a chamber that lies above the main chamber and above the canister assembly. The interior of the chamber is connected to a sweeper portion through the use of an inlet tube. The capstan and hourglass member each have small apertures in them. A Y-shaped inlet tube may be optionally used to connect the interior of the main chamber to the sweeper so that incoming fluid may be directed around the capstan for full "washing" effect.

3 Claims, 5 Drawing Sheets

CAPSULE VACUUM CLEANER ASSEMBLY

BACKGROUND AND PRIOR ART

While there are vacuum cleaners that can effectively pick-up wet and dry materials, there is none that applicant is aware of that utilize the hourglass shaped member to direct the vacuum effect to the vacuum bag. It is believed that the use of the hourglass shaped member provides for a more complete filling of the bag. As the bag begins to fill with material collected by the sweeper, the hourglass shape will direct vacuum currents toward other areas of the bag that have not been filled. The wet pick-up mode of vacuum refers to the pick-up of liquid materials through the action of the vacuum cleaner. In the invention described herein, the main chamber may be converted to wet filtration mode of operation and water and/or other cleaning liquid may be placed in the main chamber for "washing" of the incoming dry material. The vacuum may be used to simply collect water or can be converted to wet filtration mode where preferably dry material is picked up by the sweeper then sent through the siphon inlet nozzle where the dirt is washed to the main chamber(canister) for containment, yet allowing the water to circulate through the siphon nozzle. This process is continued however further until the operator decides to change the mode of operation.

SUMMARY OF THE INVENTION

The invention is a vacuum cleaner assembly comprising a main chamber, a motor chamber above the main chamber for providing a source of suction (vacuum effect) and an outside sweeper portion which does the initial pick-up of dirt, etc. and is connected to the main chamber by an inlet tube which may be a hose or other means. A chamber assembly is placed inside the main canister and is comprised of a capstan, a frusto conical member, interface plate and hourglass member. The capstan and frustoconical member have a series of apertures for directing vacuum flow from the motor chamber to a vacuum bag disposed around the capstan.

The interface plate and frusto comical member have large apertures for directing the vacuum flow upward to the motor through the motor chamber. In the wet mode of operation, the upper members (interface plate, frusto conical member and hourglass member) are removed and water or other liquid is filled in the main chamber to a point below the top of the capstan.

A Y shaped inlet tube may be optionally used to connect the interior of the main chamber to the sweeper so that incoming fluid may be directed around the capstan for full cleaning effect. A float tube and corresponding assembly control a valve above the capstan to allow the motor to continue to pull through the capstan until such time as the water level reaches a point near the top of the capstan.

It is an object of the invention to provide for greater and complete filling of vacuum bags in a vacuum by directing vacuum pressure toward different parts of the bag as other parts begin to fill.

Another objective is to provide a vacuum apparatus that can be utilized in a wet filtration mode to pickup dirt and other matter and interact it with water without creating a buildup of particles at the dirt/water interface that may interfere with the other operations of the vacuum.

Another objective is to provide a venturi that directs vacuum pressure outward and evenly from inside a capstan for a more even distribution of air.

Another objective is to provide a vacuum that would prevent the fatiguing of the motor due to the governing of the air flow.

Another objective of the invention is to provide a wet operation within the vacuum that will maintain peak suction during a wet filtration mode pickup operation until the water in the reservoir is saturated with matter to a non-flowing consistency.

Still another objective of the invention is to provide a vacuum assembly that can be utilized with the full strength suction that high CFM vacuum heads can afford.

Other objectives will become apparent to those skilled in the art once the invention is shown and described.

DESCRIPTION OF THE PREFERRED EMBODIMENT

Figure 2:
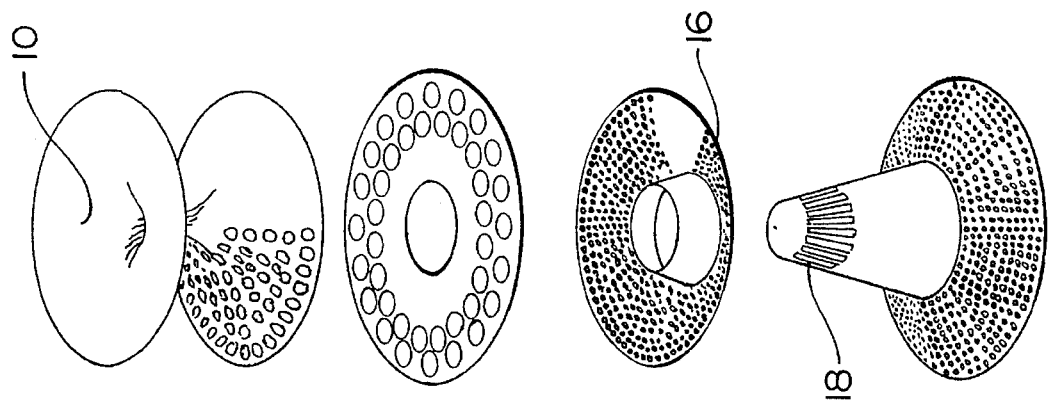
FIG. 2. View of outside of apparatus.
Figure 1:
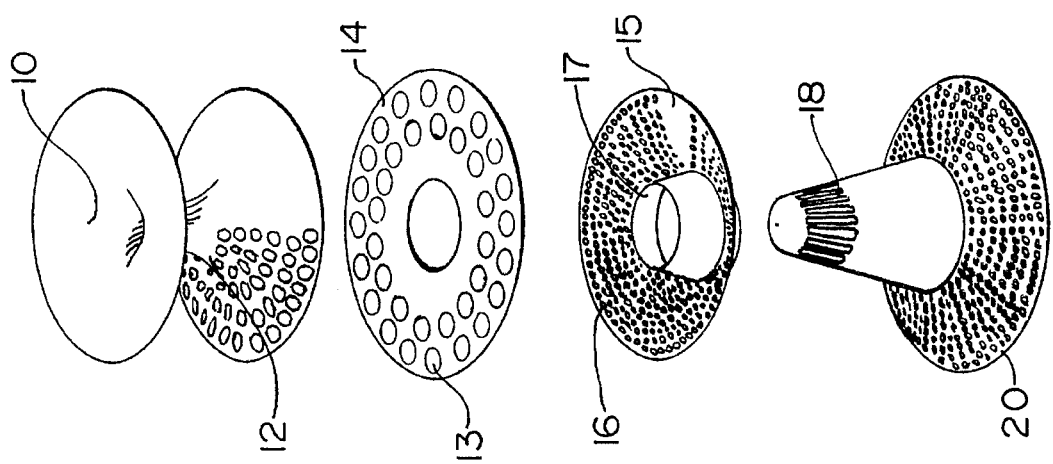
FIG. 1. Exploded view of hour glass chamber assembly.

The vacuum of the present invention provides a vacuum cleaner that can be utilized in wet or dry modes, i.e. to pick up on dry carpets or wet spills. The overall construction of the chamber portion is shown in FIG. 1. The bottom member of the assembly is the capstan 20 which is of generally conical shape tapering to a point near 18.

The capstan rests at the base of the canister and is hollow and of a conical shape with the lower and broadest part of the cone resting on the floor of the main canister. The capstan has perforations 18 near the top of the cone, they may be of circular shape or in the shape of slots (slotted variation shown in FIG. 1). The perforations are preferably about 7/16" to 5/8" in diameter when the perforations are in the form of holes and 1–4" height when they are in the form of slots. The slots may be of similar diameter as the holes. The sizes of the apertures may vary as long as they permit air to be sucked through the capstan.

The larger holes 18 create a fluid connection between the capstan and the upper members of the assembly (and the motor which is located above the chamber 30, see FIG. 3) so that the vacuum effect is felt as far down as the capstan. This creates a suction effect that extends from the bottom of the bag and along its sides. This creates a more even filling of the bag and utilizes more of the space of the bag.

The frusto conical member 16 has a series of small apertures extending almost continuously around a peripheral wall 17. A portion 15 of this wall does not have the apertures, this area corresponds to the front of the U shaped bag (when the bag is placed between the capstan and the frustoconical member) thus, there should be no pull in this area so as not to clog the area around the inlet, thus allowing dirt to pass to the rear of the bag.

The frusto conical member has an inner wall 17 which creates a large aperture in the center of the member. This large aperture allows the member to be placed over the capstan so that a nearly continuous set of small apertures may be presented by the combination of the apertures at 20 and 16. See FIG. 1.

The construction of the assembly includes the interface plate 14 which is placed over the top of the member 16. The interface member has a large aperture in the center that corresponds to the inner aperture 17 of the frustoconical member, again this is so that the vacuum effect may be extend down toward the capstan. The plate also has a series of fairly large apertures 13 to allow the vacuum effect to be felt by the frusto conical member. There may be two sets of apertures, one running on the outside of the plate and the other on the inside. Other orientations of apertures may be used.

The interface plate supports the hourglass member 10 on top of this assembly. The hourglass member has a series of apertures 12 that run along the lower half of the hourglass shape and extend approximately 180° around this lower portion. The top of the hourglass member would be in contact with the motor chamber 30 from where the vacuum effect commences.

Figure 4:
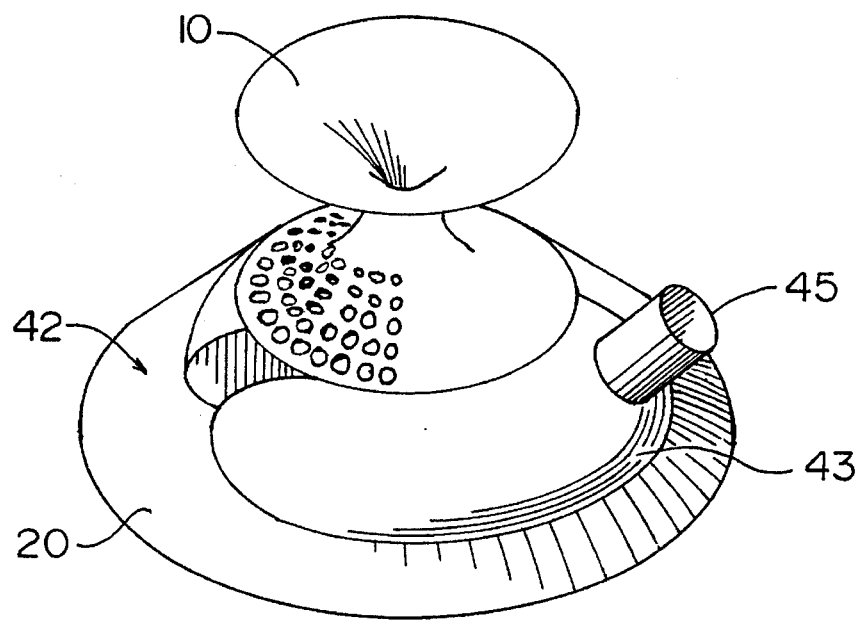
FIG. 4. Position of bag around hourglass chamber.
Figure 7:
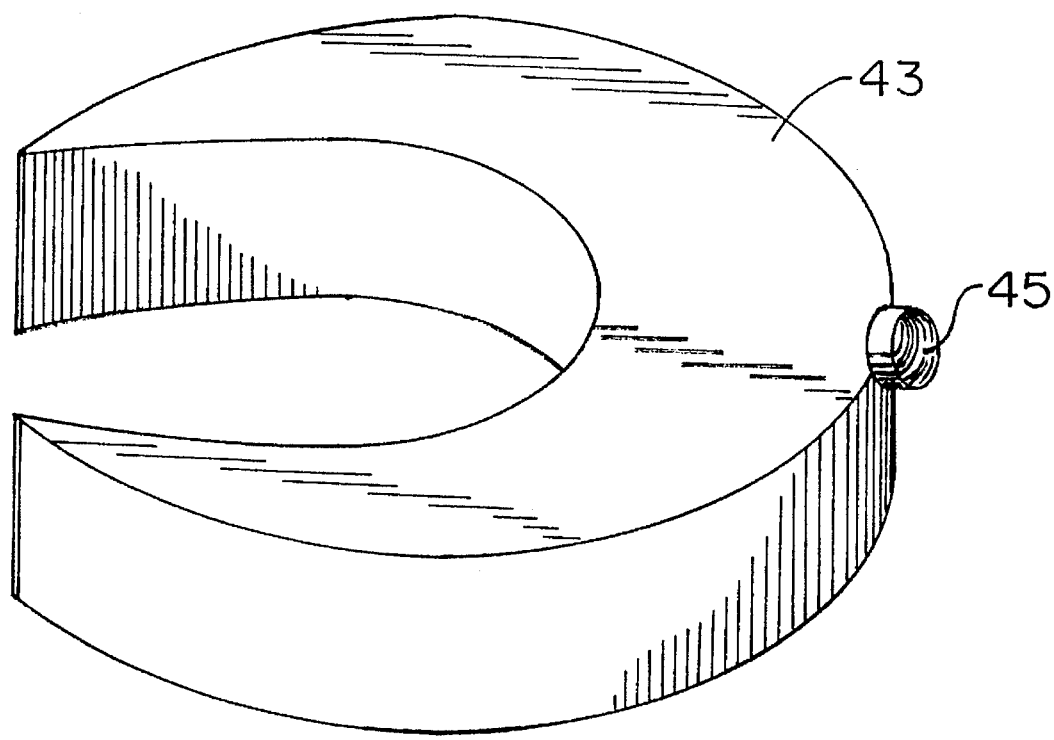
FIG. 7. Horseshoe shaped hag in side view.
Figure 8:
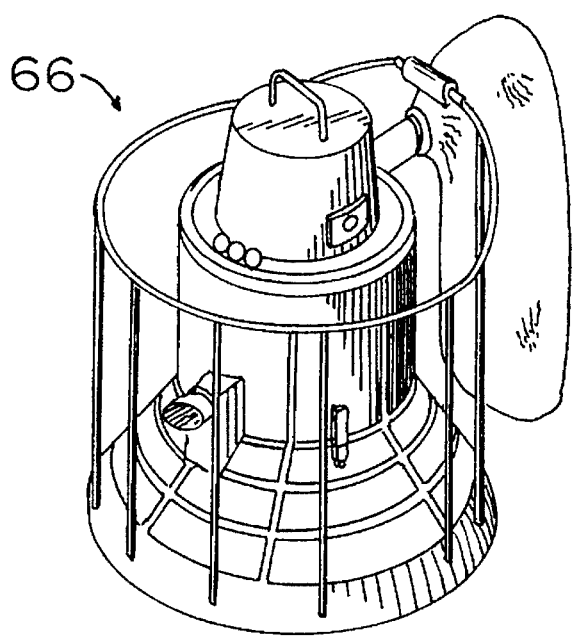
FIG. 8 Apparatus and support stand.

When using the vacuum for dry pickup, the vacuum bag 43 is disposed around the bottom of the capstan, between it and the frusto conical member, see FIG. 4. This bag should preferably be of U shape, see FIGS. 7 or may be a combination of two bags to take full advantage of the complete fill characteristics of the assembly.

The upper pieces of this assembly, the hourglass member, the interface assembly, and the frusto conical member provide the primary suction effect and will begin the action of filling the top and sides of the vacuum bag 43. The holes 12 in the hourglass member direct the initial action of the vacuum toward the rear of the bag, that is the ends 42 of the U shaped bag are close to these holes 12 and initially strong suction is directed back there. The apertures 16 direct the suction toward the upper portions of the U shaped bag.

As the bag fills, the lower part of the capstan will direct suction toward the bottom portions of the bag, this process is known as secondary suction. The interface plate 14 insures an even distribution of the suction between the hourglass member and the frustoconical member. As different parts of the bag fill up, the vacuum pressure will be directed toward different areas through this plate. Resulting in a filling pattern from back to front and from top to bottom.

The upper holes 18 in the capstan should be in close connection with the holes 12 in the hourglass member. As the top of the bag fills, this area around 12 will stop drawing the vacuum pressure (as it is blocked by the material in the bag) and the pressure will be directed downward through the capstan where the holes at 20 will begin drawing at the bottom of the bag and cause the bottom of the bag to be filled in turn.

A rubber seal may be used around the top of the capstan below the holes 18 to insure the isolation of the holes 20 in the lower part of the capstan from the other parts of the assembly. As the bag becomes filled, a light or other indicator may be used to signal this occurance and prevent further strain on the motor.

Figure 6:
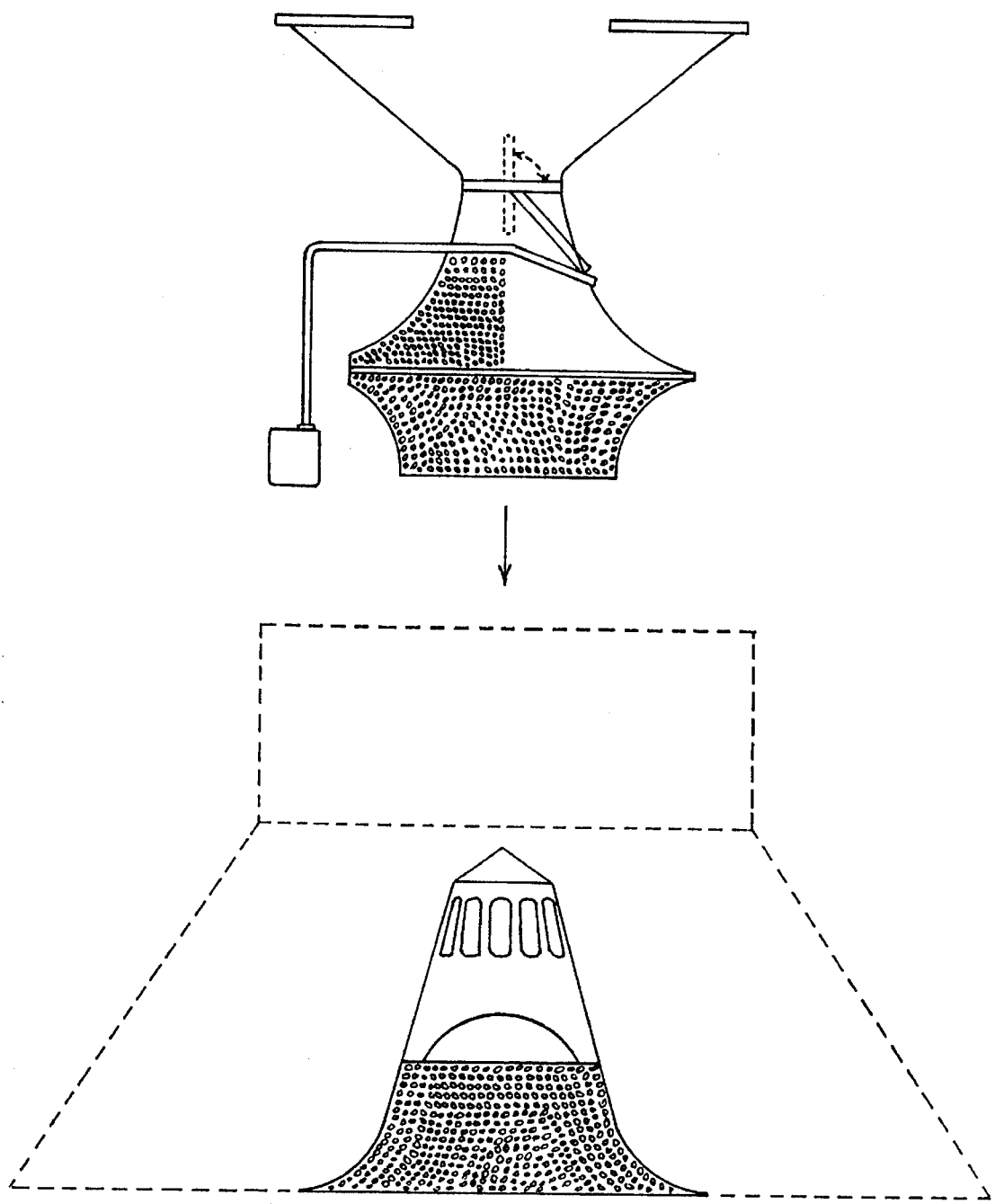
FIG. 6. Placement of hourglass chamber inside vacuum canister.

The support chamber is 30 and lies above the main chamber 40 and is above the assembly as well. This chamber supports the other two working chambers, the hyperactive and hourglass, by the rim 68. That is, the hyperactive chamber and the hourglass canister may be supported by placement on top of this rim, see FIG. 6 for the placement of the hyperactive/hourglass chambers. The motor is in the chamber 31 above the support chamber and provides the vacuum effect for drawing dirt, etc. in through the inlet tube 24 and into the vacuum bag 43.

Figure 3:
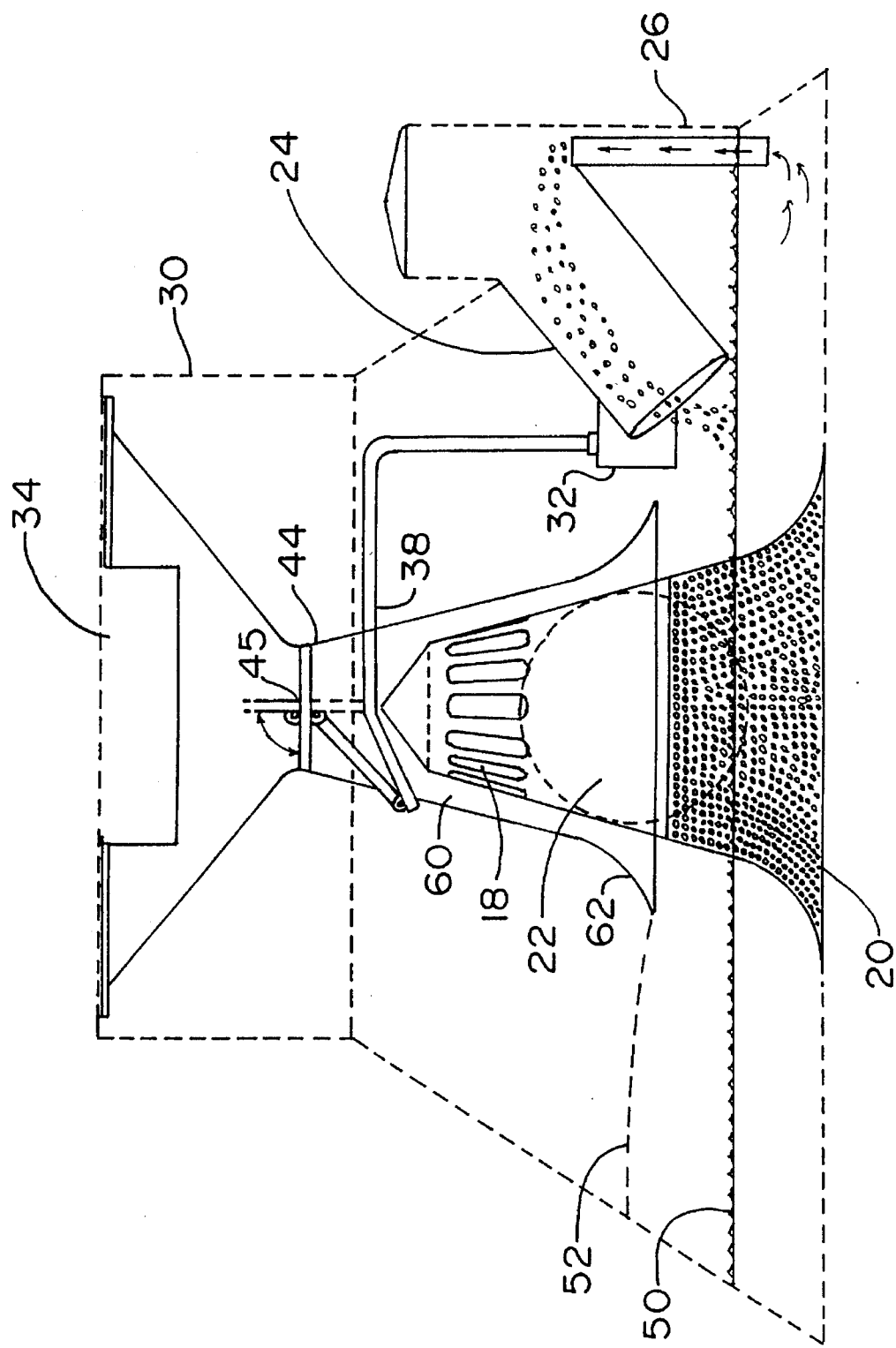
FIG. 3. Interior of hyperactive induction chamber showing inlet tube, float assembly and canister in wet spill pickup mode.

The bag should come with an entrance passage 45 so that the bag may be connected to the inlet tubes at 24 in FIG. 3. The float would lie at the position shown as 32 in this mode (see FIG. 3). The float would lie opposite the inlet tube at the position shown as 42 in FIG. 4.

Note that the hourglass member need only be installed when using the vacuum in the dry pickup mode. In the wet spill pick-up mode, the hourglass member, interface plate and frustoconical 1 member may be removed so that the float member assembly may be disposed over the capstan for wet spill pickup, see FIG. 3 and 5.

Figure 5:
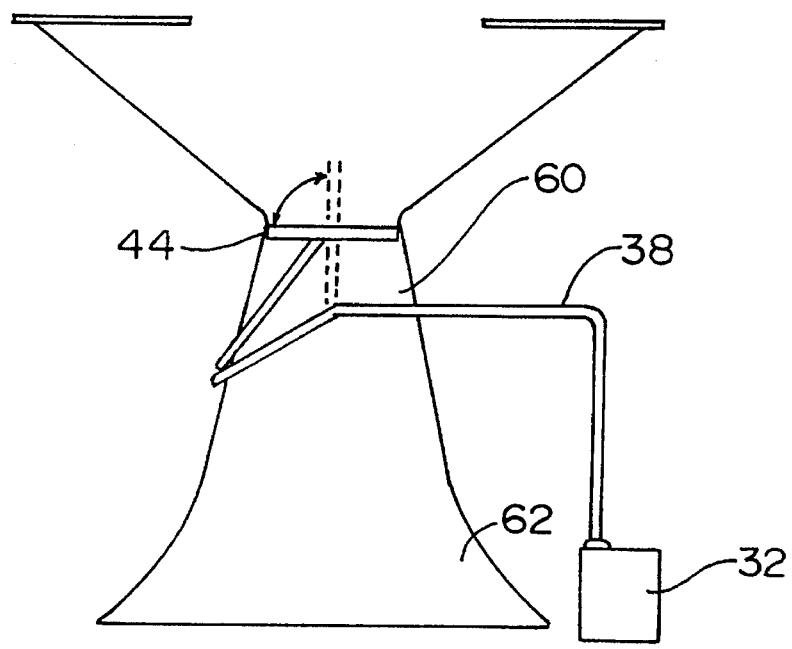
FIG. 5. Venturi Induction chamber with float control used for wet spill pickup.

The wet mode assembly is shown in FIG. 3. The capstan remains in position and the hyperactive filter assembly is placed over this. The filter assembly, see FIG. 5, is venturi shaped for maximizing the vacuum pressure. The assembly flanges outward 62 near the bottom where it contacts the area of the capstan below the large apertures 18. The valve 44 should come in contact with the top of the capstan. The float 32 closes this valve when the water level approaches that line shown as 52 which would be at the bottom of the hyper-active filter.

When the Y shaped inlet tube 24 (see FIG. 3) is used, the float 32 should be disposed between the two prongs of the Y so as not to interfere with the operation of the air flow coming through the inlet tube. Placing the float here isolates the float from high degree of splash activity. It is preferred that the float assembly be supported from the center of the venturi induction chamber at point 44. The valve may be disposed across a pin running 45 across this opening and allows the flaot arm 36 to pivot upon it.

Water or other cleaning fluid may be filled initially in the main chamber. The water, etc. may be effectively added up to the level shown as 50 so that it doesn't interfere with the incoming material at the inlet 24. The siphon tube 26 picks up water from the main chamber and draws it upward where it will contact the incoming material in the inlet tube 24. The resulting mix is then directed out of the tube and into the main chamber. The use of the Y tube enhances this operation as the water and dirt material will be directed at the sides of the main chamber.

As the level of water reaches a level that is close to the top of the capstan (line 52), there is a danger that water will become sucked up through the perforations in the top of the capstan and into the motor with the danger of electrical short and/or motor damage. To prevent this, a float ball 22 is used inside the capstan. The ball rises and falls as the water level within the canister rises and falls, see FIG. 3. By the time the water level reaches a dangerous point, the float ball will have risen to the level of the capstan perforations thereby preventing further vacuum flow through the capstan and effectively shut off the vacuum and prevent the water from coming into the motor.

A foam type filter may be used at the position indicated as 34. The foam filter will prevent movement of any liquid through it and act as a safeguard to isolate the motor from the liquid.

The Y inlet 24 (see FIG. 3) is optional and may be used in either the wet or dry pickup modes. The purpose is to provide a more efficient mixing of the dirt and water at the plenum, or center of the Y, during wet filtration mode of operation.

This is because the material that is picked up (be it liquid or solid) will be smoothly diverted around the main chamber. This effect is especially good with the high powered, high CFM vacuum heads (note that "high CFM" refers to high volume airflow). The Y also provides for the air and water mixture to be directed against the sides of the canister. This effect explains the need for a conical shaped canister for the main chamber 64. This leads to another object of the invention which is to utilize the exterior surface area of the canister for storage of vacuum hose and attachment of post dust bag to the cage 66.

During dry mode operation it is preferred that a U-shaped vacuum bag 43 be used, see FIG. 4. This bag would be of U shaped and of a tubular nature i.e. it is not flat like the letter "Y" but does have 3 dimensional character. The inlet portion 45 of this bag would be at the bottom of the "U" so that as dirt enters the inlet it will be directed toward the back of each portion of the U by the hourglass chamber. This should result in greater fill of the bag.

The wet spill pick-up mode is used with out the bags, however in the event of an emergency (where it is necessary to use the vacuum quickly) this vacuum cleaner may be used to pick up liquid spills even with the bag in place if necessary. This is the reason for the float in FIG. 6. In this emergency wet spill pick-up mode, the bag or bags should be removed immediately after use as the water and dirt mixture may cake onto the canister through the bag.

One of the advantages of the hydroactive filtration system (wet filtration mode operation) over current vacuums is that water is propelled with the air at an area that is away from the induction chamber and the capstan in this invention. Thus, water is mixed with the incoming dirt and dust in the tube 24 before the dirt/dust can hit the level of the water in the main chamber. The advantage of water saturation before the plumetting of the debris into the liquid in the main chamber is that saturating the debris makes the debris heavier and more likely to settle into the water. Hence, the dirt and dust particles are less prone to float above the water level and possibly be drawn into other members of the assembly.

Heavier dirt saturated with water means less dirt activity where the incoming dirt impacts with water, in this case at line 50 below the inlet tube 24 in FIG. 3. Without this saturation of the particles in the inlet tube, a constant pocket of air could not possibly saturate all of the dirt particles into the water, especially at the velocities that powerful vacuum heads can afford.

Therefore, the incoming dirt is saturated with moisture which enables a large portion of it to plummet into the reservoir in the main chamber and is finally bombarded with more incoming dirt and water mix. The present invention prevents the dust from rising off the water level because the dust is instantly mixed with a stream of water (already mixing) before it hits the reservoir water level in the main chamber or canister.

I claim:

1. An improved vacuum cleaner assembly for a vacuum cleaner, said assembly comprising: a capstan of conical shape and having an upper half and a lower half and having a plurality of secondary apertures in said bottom half of said capstan, said upper half of said capstan having a plurality of primary apertures, said primary apertures larger than said secondary apertures, a frusto-conical member having an outer wall of curved construction and an inner wall, said outer wall having a plurality of apertures, said inner wall having an opening of size adapted to fit over said capstan, said frusto-conical member placed over said capstan so that a portion of said upper half of said capstan will protrude above said inner wall, an hourglass member having an upper and a lower half that form an hourglass shape and having a plurality of holes in said lower half of said hourglass member, said lower half of said hourglass member placed in connection with said frusto-conical member so that said lower half of said hourglass member is in close connection with said primary apertures, a means for creating a vacuum, said means for creating a vacuum placed above said hourglass member so as to create a suction effect through said capstan.

2. The assembly of claim 1 having an interface plate having a relatively flat surface and of roughly circular shape, said plate having a plurality of apertures and placed between said frusto conical member and said hourglass member.

3. The assembly of claim 2 having a Y shaped inlet tube in close connection with said capstan so as to be able to direct a stream of particles around said secondary apertures.

* * * * *